Aug. 29, 1939.  C. F. CRUMB ET AL  2,171,025
RAKE TOOTH CONSTRUCTION
Filed March 19, 1938  2 Sheets-Sheet 1

Inventors
Charles F. Crumb and
Edward Mowry
By V. F. Lassagne
Atty.

Aug. 29, 1939.  C. F. CRUMB ET AL  2,171,025
RAKE TOOTH CONSTRUCTION
Filed March 19, 1938  2 Sheets-Sheet 2

Inventors
Charles F. Crumb and
Edward Mowry
By [signature]
Atty.

Patented Aug. 29, 1939

2,171,025

UNITED STATES PATENT OFFICE 2,171,025

RAKE TOOTH CONSTRUCTION

Charles F. Crumb, Chicago, and Edward Mowry, Rock Falls, Ill., assignors to International Harvester Company, a corporation of New Jersey Application March 19, 1938, Serial No. 196,967

4 Claims. (Cl. 56—400)

This invention relates to a rake construction. More particularly, it relates to a means for holding teeth of a side delivery rake which have broken from the carrying bar.

It frequently happens that, during usage, rake teeth will break adjacent their point of connection to the carrying bar and drop into the hay or whatever crop is being raked. One mode of obviating this disadvantage has been to have the coil in the rake tooth surround the carrying bar. Then, if the tooth breaks, (and it will normally break between the coil and the point at which it is fastened to the carrying bar), the tooth will stay on the carrying bar. The disadvantage with such an arrangement is that the broken tooth must be slid endwise from the carrying bar and a new one put over the end in the same way.

Accordingly, the principal object of the invention is to provide a means which will prevent a broken tooth from falling from its carrying bar and yet not require that, for replacement, the broken tooth be slid over the end of the bar.

A further object is the provision of a means which will prevent a broken rake tooth from falling from the carrying bar, and which will yet allow a proper raking action.

Other objects will appear from the disclosure.

According to the present invention, a rake tooth is held by a clamp to a carrying bar with the coil of the tooth near the bar. A wire extends through the coil and is secured to the clamping bar. This wire may have its ends secured to one another, so as to form a closed loop, or it may have its ends secured to the clamp and form with the clamp a closed loop.

Figure 1:
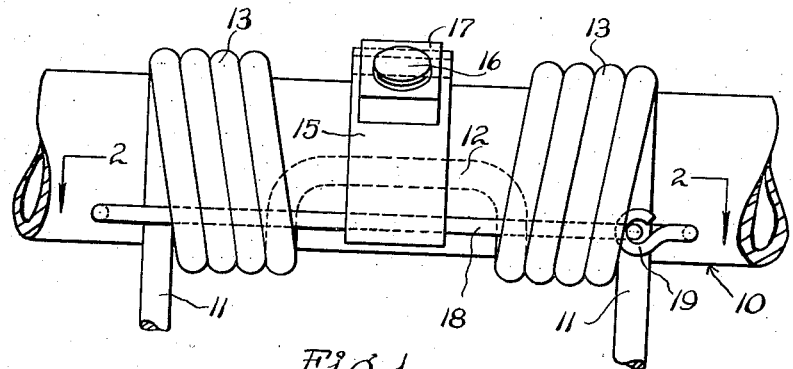
Figure 1 shows an elevation of a section of the carrying bar with a pair of rake teeth clamped thereto.
Figure 2:
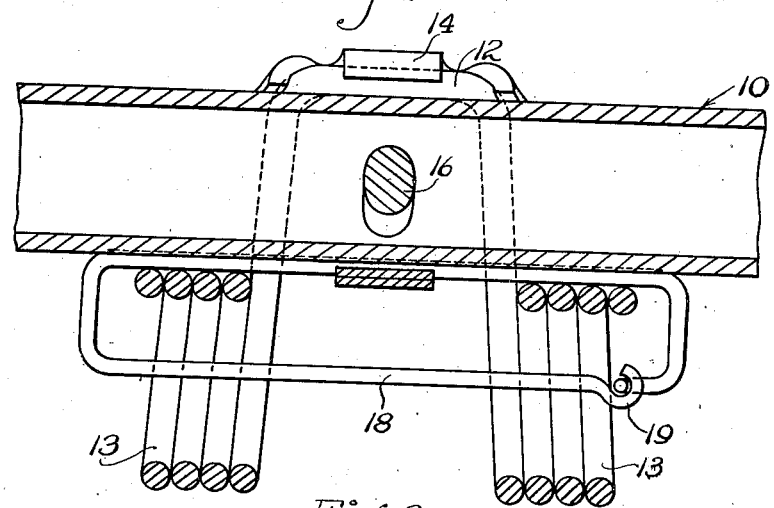
Figure 2 shows a section taken along the lines 2—2 of Figure 1.
Figure 3:
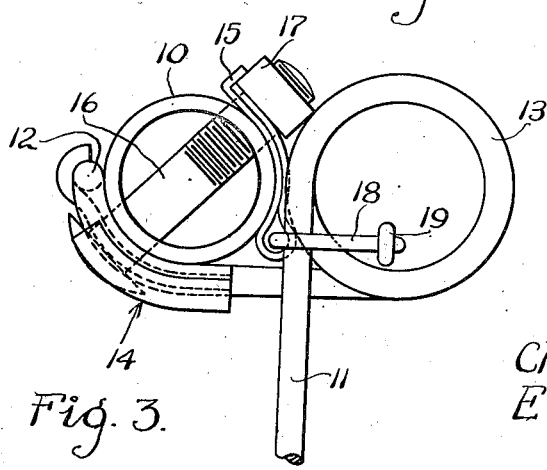
Figure 3 shows in side elevation the structure of Figure 1.

As shown in Figures 1, 2 and 3, a carrying bar 10 supports a pair of rake teeth 11, which are joined at a common central section 12, clamped to the carrying bar. Each of the teeth has coiled sections 13. The clamping means for holding the teeth against the bar consists of a member 14, which holds the common central section against the bar, a reversely bent member 15 on the opposite side of the carrying bar supporting a carrying loop, presently to be described, and a bolt 16 extending through the bar with its head against the member 14 and a nut 17 resting on the member 15. A loop 18, preferably formed of wire with its ends joined, as at 19, is carried by the member 15 and extends through the coiled sections of both teeth.

From the foregoing description, it will be seen that, by means of the loop, either or both of the rake teeth will be prevented from dropping away from the carrying bar in case of a break in the coiled section or between the coiled section and the point of attachment to the bar.

Figure 4:
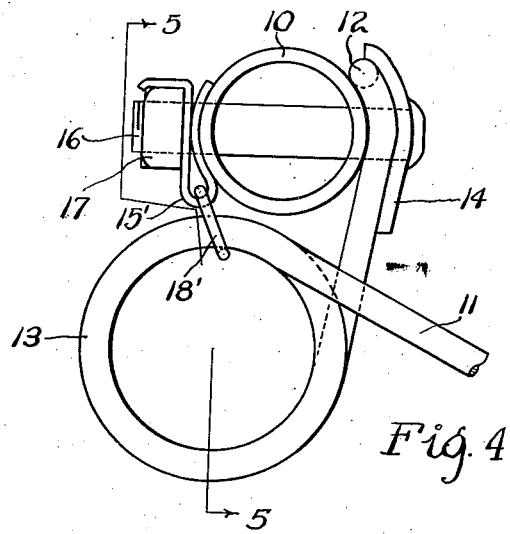
Figure 4 shows a side elevation of the structure of Figures 1 and 3 with a modified form of wire loop for the rake teeth; and, Figure 5 shows a section taken along the lines 5—5 of Figure 4.
Figure 5:
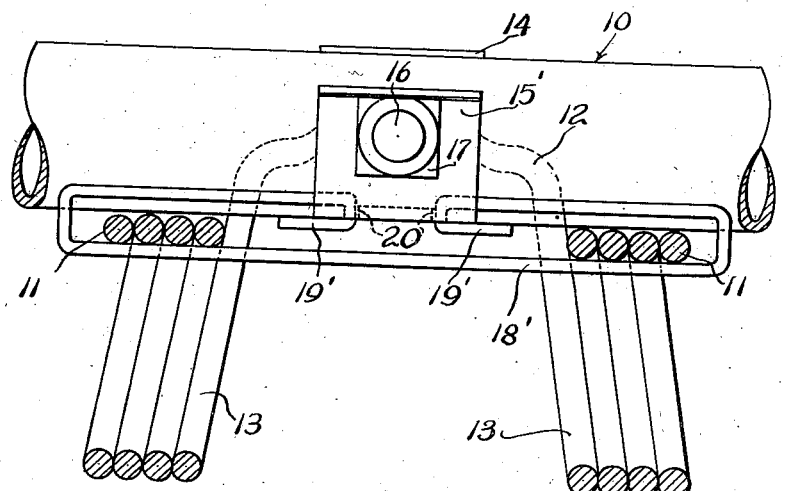

Figures 4 and 5 show a modification in which a wire 18' extends through the coils of the rake teeth and has its ends 19' extending through and bent over in recesses 20 in a reversely bent clamping member 15'. In this modification, the wire, together with the clamping member 15', forms a closed loop for retaining the coils, in contrast to the modification of Figures 1, 2 and 3, where the wire itself, with its ends joined, forms a complete loop.

It will be apparent that changes may be made in the above construction without departure from the spirit of the invention; for example, the retaining loop may be used just as well in a case where the rake teeth are formed separately instead of in pairs. The loop may pass through the coiled section of but a single tooth. Furthermore, it is apparent that the invention is not limited to a rake tooth construction, but may be employed in any case where a tooth or object of similar configuration with a coiled section is clamped to a carrying bar.

It is intended to limit the invention only within the terms of the appended claims.

What is claimed is:

1. In a rake construction comprising a carrying bar, a pair of rake teeth having coils therein and being integrally joined to one another at a common central section, and means securing the rake teeth to the bar at the common central section, the combination therewith of an additional securing means for said teeth comprising a wire element in the form of a loop attached to the bar and interlinked with the coils of the teeth.

2. In a rake construction comprising a carrying bar, a rake tooth having a coil therein, and means securing the tooth to the bar, the combination therewith of an additional securing means for said tooth comprising an element in the form of a loop attached to the bar and interlinked with the coil of the tooth.

3. In a rake construction comprising a carrying bar, a rake tooth having a coil therein, and means securing the tooth to the bar, the combination therewith of an additional securing means for said tooth comprising an element secured to the bar and extending through the coil of the tooth.

4. In a rake construction comprising a carrying bar, a rake tooth having a coil therein, and means securing the tooth to the bar, the combination therewith of an additional securing means for the tooth comprising an element extending through the coil of the tooth and being secured to the bar by means which secures the tooth to the bar.

CHARLES F. CRUMB.
EDWARD MOWRY.